United States Patent [19]

Heimer

[11] Patent Number: 4,958,603
[45] Date of Patent: Sep. 25, 1990

[54] BRACE FOR CONNECTING AN AUXILIARY COMPONENT TO AN INTERNAL COMBUSTION ENGINE

[75] Inventor: Karl-Heinz Heimer, Trebur, Fed. Rep. of Germany

[73] Assignee: General Motors Corporation, Detroit, Mich.

[21] Appl. No.: 474,867

[22] Filed: Feb. 5, 1990

[30] Foreign Application Priority Data

Feb. 22, 1989 [DE] Fed. Rep. of Germany ... 8902070[U]

[51] Int. Cl.⁵ .................. F16M 13/00; F02B 67/00
[52] U.S. Cl. .......................... 123/195 A; 248/666; 248/674
[58] Field of Search ............ 123/52 M, 195 A, 198 E; 248/666, 674, 675

[56] References Cited

U.S. PATENT DOCUMENTS

| | | | |
|---|---|---|---|
| 2,231,287 | 2/1941 | Fox | 180/54 |
| 2,467,759 | 4/1949 | Lord | 248/5 |
| 2,477,501 | 7/1949 | Tyler et al. | 248/5 |
| 3,274,394 | 9/1966 | Maheu | 248/666 |
| 4,470,378 | 9/1984 | Malik et al. | 123/52 M |
| 4,506,522 | 3/1985 | Swaney et al. | 123/195 A |
| 4,633,828 | 1/1987 | Steele | 123/195 A |
| 4,653,440 | 3/1987 | Fukuhara et al. | 123/52 M |

FOREIGN PATENT DOCUMENTS

| | | | |
|---|---|---|---|
| 2450226 | 6/1976 | Fed. Rep. of Germany ... | 123/195 A |
| 85473 | 5/1984 | Japan | 123/195 A |
| 1026943 | 4/1966 | United Kingdom | 123/195 A |
| 2070727 | 9/1981 | United Kingdom | 248/666 |

Primary Examiner—David A. Okonsky
Assistant Examiner—Weilun Lo
Attorney, Agent, or Firm—Ronald L. Phillips

[57] ABSTRACT

A brace connecting a generator to an internal combustion engine has spherical and cup shaped elements at its attaching ends for facilitating attachment of these components in various relative positions.

5 Claims, 2 Drawing Sheets

BRACE FOR CONNECTING AN AUXILIARY COMPONENT TO AN INTERNAL COMBUSTION ENGINE

Technical Field

The invention pertains to a brace for connecting an auxiliary component to an internal combustion engine and more particularly to a brace for accepting attachment elements that can be connected to such components and can be braced between the head of the attachment element and the attached component unit.

Background of the Invention

A brace of the type mentioned is especially used in belt-driven auxiliary automotive components such as alternators and power steering pumps which are directly or indirectly pivotally connected to the internal combustion engine. The brace makes it possible to cover various positions of the auxiliary components which are produced by pivoting of same when the V-belt tension is increased, and which must, in this case, compensate a certain pivot angle and a change in distance.

In the past, a damped attachment to the internal combustion engine was preferred for auxiliary engine units, for example, by means of elastomer bushings. To reduce the oscillation speeds occurring in such elastic bearings at certain engine rotations per minute to a permissible value, a change was recently made to a fixed mounting of the auxiliary engine component, especially to a fixed attachment of the generator.

Summary of the Invention

The present invention offers a brace of the type mentioned, which is compact and rigid and makes possible various positions of the internal combustion engine and the auxiliary engine component in relation to each other by compensating a certain pivot angle and a change in distance.

According to the present invention, the brace in the region of each attachment point between the head of the attachment element and the brace as well as between the brace and the auxiliary component and engine, in each case, has a spherical segment adjacent to the brace and a ball cup adjacent to the head or the component wherein the spherical segment is provided on its side turned towards the attached ball cup with a bend directed to it and wherein the ball cup is provided with a corresponding bend directed away from the attached spherical segment. The spherical segments and the ball cup are provided with recesses for accepting the attachment element but these recesses in the spherical segments are larger than the size of the part of the attachment element penetrating them. Moreover, the brace recess of at least one brace attachment point in its longitudinal direction is made larger than the size of the part of the attachment element penetrating it.

Due to the combined effect of the spherical segments and the ball cups, the brace according to the invention makes possible an angle compensation of the units that can be moved in relation to each other. The spherical segments are correspondingly pivoted between the ball cups when the brace is pivoted, whereby due to the dimensions of the recesses in the spherical segments, which are penetrated by the attachment element, the pivot movement can proceed unhindered. On the other hand, due to the pivot movement the length compensation that becomes necessary takes place through the special design of the brace recess in the region of at least one brace attachment point, which in its longitudinal direction has larger dimensions than the size of the part of the attachment element penetrating it.

By means of the above-described design of the brace according to the invention, the auxiliary component and engine are connected to each other within a defined pivot area. In the meaning of the invention, special consideration is made to the connection of an auxiliary engine component, such as a generator, a power steering pump, an air conditioning compressor, etc., which is pivotably attached directly or indirectly to the internal combustion engine; thus, in an indirect connection to the internal combustion engine, for example, a connection of the auxiliary component to the intake manifold should be understood. The brace according to the invention also serves the purpose of bracing the auxiliary engine component axially where such component is otherwise directly or indirectly pivotably connected to the internal combustion engine.

Due to the design of the brace according to the invention, the spherical segments slide in the axial direction of the brace when the auxiliary component is pivoted. The slide path is thereby dependent on the ball radius selected and the change in angle. To make the brace very compact, a special embodiment of the invention provides that the ball radius of the spherical segments is larger than the distance of the ball apex from the brace area allotted to the spherical segments Advantageously, the areas of these parts turned away from the arched areas of the spherical segments are made flat, whereby the recesses of these parts penetrate the arched and flat areas vertically. Moreover, the spherical segments are provided with recesses conically expanding in the direction of the attached ball cup, which due to their conicity then makes possible a pivotal movement of the brace and thus the spherical segments adjacent to the attachment elements penetrating the spherical segments. Furthermore, the brace recess in the region of at least one brace attachment point is formed as an elongated slot to optimally take into account the circumstance that in the case of a pivot movement of the auxiliary engine component the brace in the region of this brace attachment point is then shifted in the axial direction.

An especially favorable introduction of the brace forces by the auxiliary engine component into the internal combustion engine is then ensured by the braces in the region of both ends receiving the said recesses being provided with bends arranged in opposite directions.

Detailed Description of the Invention

Figures 1, 1A:
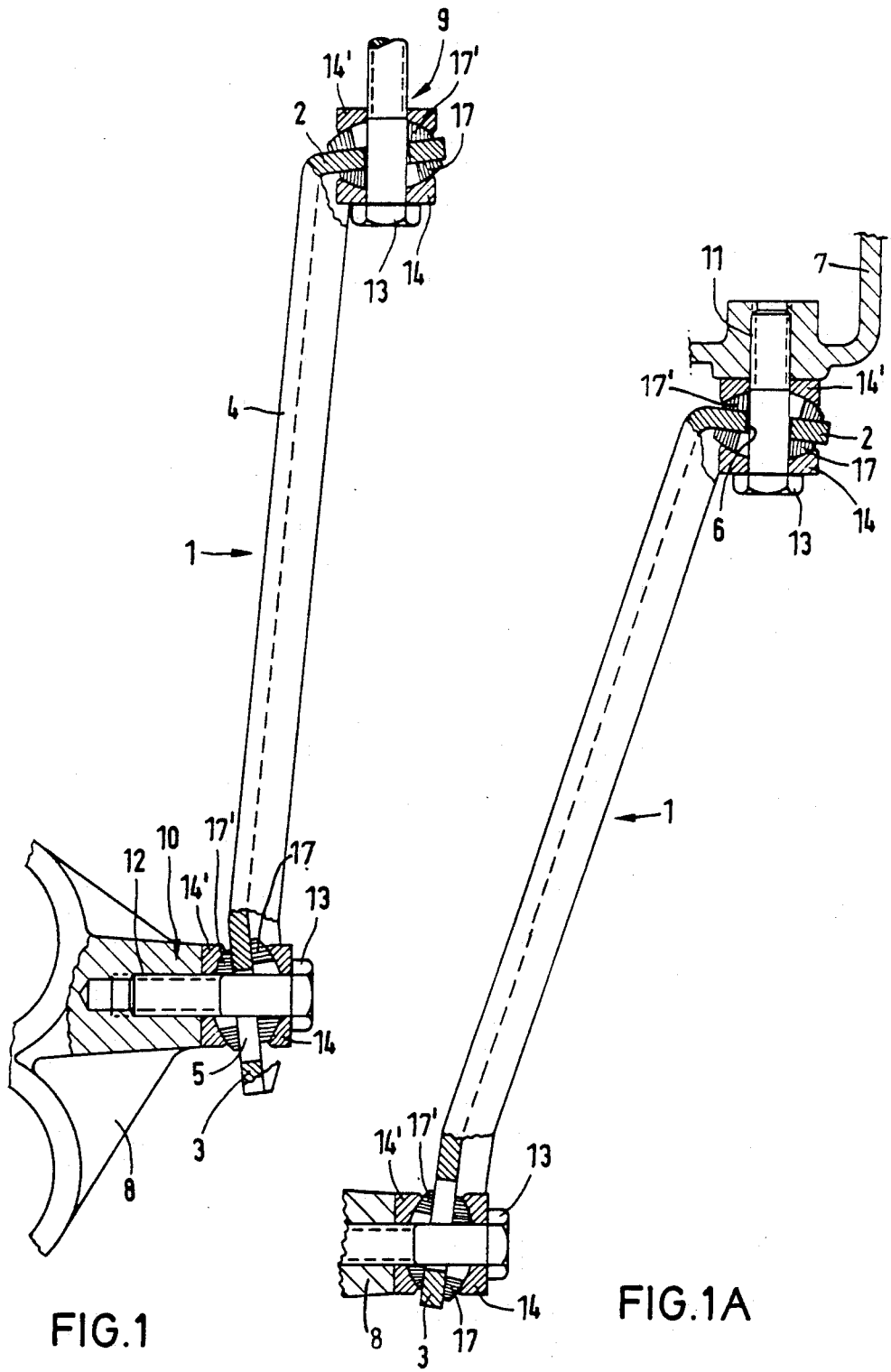
FIG. 1 shows the connection of an auxiliary engine component to an internal combustion engine by means of the brace according to the invention.
FIG. 1A is a view similar to FIG. 1 but showing the auxiliary component displaced.

FIG. 1 shows a brace 1 which in the region of its two ends is provided with bends 2 and 3. Bend 2 forms an angle of 100° with a brace central part 4, bend 3 forms an angle of 170° with the brace central part 4, and both bends 2 and 3 are arranged in opposite directions. Bend 3 has an elongated slot 5 expanding in the longitudinal direction of the brace 1, while bend 2 is provided with a common circular bore 6.

The brace 1 according to the invention serves as the auxiliary brace of a generator shown only for a part of a housing 7 on an intake manifold 8 (also only partially shown) of an internal combustion engine (not shown). The generator is pivotably connected (not shown in detail) to the internal combustion engine and is driven via a belt drive (also not shown in detail) by the internal combustion engine; the brace 1 according to the invention in this connection serving the purpose of covering the various generator positions, which are produced by the pivoting of the generator when the V-belt is adjusted.

Viewed in detail, the brace 1 is attached to the generator housing 7 and the intake manifold 8 by means of two bolts 9 and 10. The bolt 9 penetrates with clearance the bore 6 of the bend 2 and is threaded into a tapped hole 11 in the generator housing 7. The bolt 10 penetrates the elongated slot 5 of the bend 3 and is threaded into a tapped hole 12. Moreover, the bolt 9 proceeding from its bolt head 13 penetrates a first ball cup 14, which with a flat section 15 is adjacent to the bolt head 13 and which on its side turned away from the flat section 15 is provided with a ball arch 16 directed towards the bolt head 13, that is towards the inside, as well as a first spherical segment 17, the ball arch 18 of which is juxtaposed with the ball arch 16 of the ball cup 14 and the flat area 19 of which, turned away from the ball arch 18, is adjacent to a flat side 20 of the bend 2 which is formed as a plate. Finally, the bolt 9 penetrates another spherical segment 17' and a ball cup 14' concurrent with it, the ball cups 14 and 14' as well as the spherical segments 17 and 17' being arranged symmetrically in relation to the central plane 21 running parallel to the flat side 20 of the bend 2, such that the flat section 15' of the ball cup 14' is arranged on the housing 7 of the generator, as well as a juxtaposition of the ball arches 16' and 18' of the ball cup 14' and the spherical segment 17'. Finally, the flat area 19' of the spherical segment 17' is adjacent to the flat area 20' of the bend 2.

Figure 2:
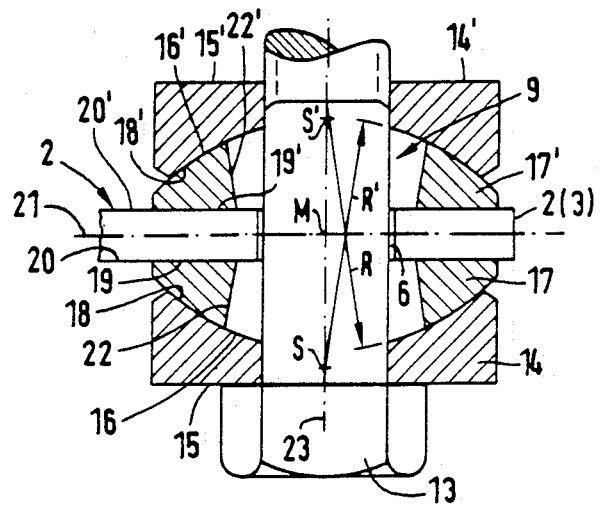
FIG. 2 shows a detailed representation of the brace in the region of a brace attachment point for a non-pivoted brace and in relation to its central point around a certain dimension of the displaced spherical segments.

Referring to FIG. 2, the spherical segments 17 and 17' are provided with recesses 22 and 22' which conically expand in the direction of the attached ball cups 14 and 14', the diameter of which in the said tapered area is about one-third larger than the diameter of the bolt barrel penetrating them. Furthermore, it will be seen that the ball radii R and R' of the spherical segments 17 and 17' are larger than the distance of the ball apices S and S' from the brace region allotted to the spherical segments 17 and 17', expressed by the central point M lying in the central plane 21.

Figure 3:
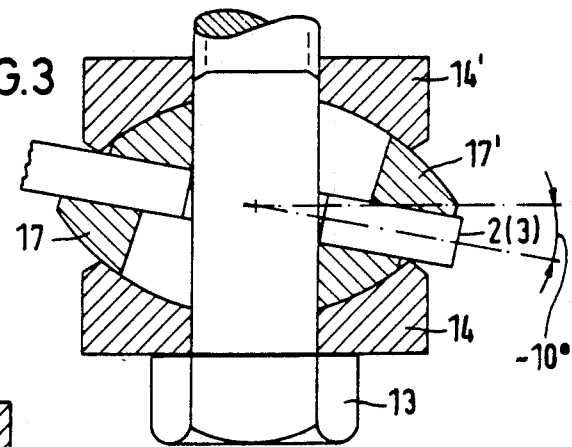
FIG. 3 shows a representation according to FIG. 2 for a pivoted brace.

Apart from the fundamental representation of the constructive proportions of the brace in the region of a brace attachment point in FIG. 2, FIG. 3 shows also the kinematic changes when the brace 1 and thus the bend 2 are pivoted from the position shown in FIG. 2 designated as the non-pivoted position into a position pivoted by an angle of about 10°. When transferring into this position, both spherical segments 17 and 17' are moved, the recesses 22 and 22' of which are arranged, in opposite directions, in the non-pivoted position concentrically to the bolt longitudinal axis 23, such that they are adjacent to the bolt barrel in the inner sides of the spherical segments 17 and 17' lying opposite the end position shown in FIG. 3. During this change in position, due to the same bend radius, the ball arches 18 and 18' of the spherical segments 17 and 17' slide into the ball arches 16 and 16' of the ball cups 14 and 14', and the flat areas 19 and 19' of the spherical segments 17 and 17' slide onto the flat areas 20 and 20' of the bend 2. The flat curvature of the ball cups 14 and 14' and of the spherical segments 17 and 17' thereby make possible a flat formation of the brace in the region of the brace attachment point shown, whereby, in this embodiment, however, the pivot angle of the bend 2 and thus of the brace 1 is limited.

The brace attachment point in the region of the bend 3 is also designed to correspond to the formation of the ball joint described previously for the brace attachment point in the region of the bend 2, with the only difference being that, as described above, the recess is formed as an elongated slot 5 running in the longitudinal direction of the brace 1. The brace 1 in the area of the bend 3 can thus execute not only rocking motions around the barrel of the bolt 10, but can also be shifted in the central plane 21 in the longitudinal direction of the elongated slot 5. The representation of FIGS. 2 and 3 is thus correspondingly transferable for the connection of the brace in the region of its bend 3.

Figure 4:
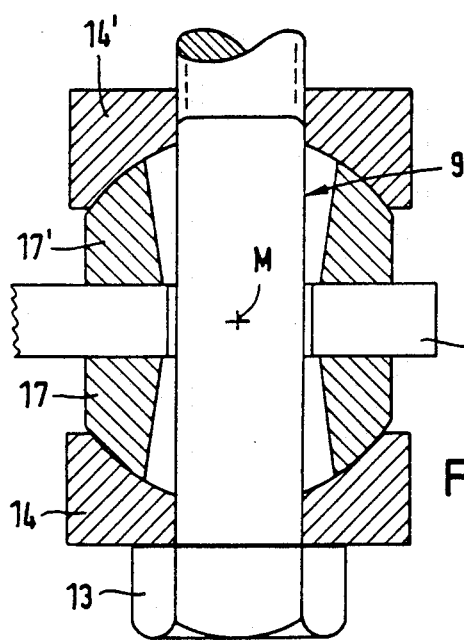
FIG. 4 shows a representation of the brace in the region of a brace attachment point similar to the representation in FIG. 2 for a non-pivoted brace, yet in an embodiment in which the spherical segment central points are not displaced.

If the V-belt tension is no longer adequate for driving the generator and therefore the V-belt tension must be increased to maintain a functional driving of the generator, it is only necessary to loosen both bolts 9 and 10 until the friction tightness of the two ball joints is raised. The generator can then be pivoted in the direction of an increased tension of the V-belt, for example, in the displayed position shown in FIG. 1A; in this position then both bolts 9 and 10 are again tightened so that the generator remains axially braced in this position. FIG. 1A illustrates that in the case of a change in the generator position, the brace, due to the cooperation of the bend, the spherical segments and the ball cups, can follow the changes in the angle, and the elongated slot in the bend on the intake manifold side makes possible the length compensation that becomes necessary due to the pivoting of the brace Corresponding to the representation of FIG. 2, FIG. 4 shows spherical segments 17 and 17' and ball cups 14 and 14', the arc radii of which coincide in a common central point M and thus make possible a pivot angle of the brace, which is greater than 10°.

The foregoing description of the preferred embodiments of the invention have been presented for purposes of illustration and description. It is not intended to be exhaustive or to limit the invention to the precise forms disclosed as obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. Brace for connecting an auxiliary component such as a generator to an internal combustion engine wherein the brace is provided with recesses in respective regions having respective brace attachment points for accepting respective attachment elements that can be connected to each of the component and engine and are braced between a head of the attachment element and the respective auxiliary component and engine, characterized in that the brace in the region of each attachment point between the head of the attachment element and the brace as well as between the brace and the respective component and engine has, in each case, a spherical segment adjacent to the brace and a ball cup on the head and adjacent to the respective component and engine, the spherical segment on a side thereof turned towards the attached ball cup having an arch directed towards it, the ball cup having a corresponding matching arch, and each of the spherical segments and the respective ball cups having recesses for accepting the attachment element, the recesses in the spherical segments being larger than the size of the part of the attachment element that penetrates them, and the recess of at least one brace attachment point in its longitudinal direction being greater in size than that part of the attachment element penetrating it.

2. Brace in accordance with claim 1, characterized in that the radius of the spherical segments is greater than the distance of the apex of the segments from the brace region having the spherical segments.

3. Brace in accordance with claim 1, characterized in that the spherical segments have recesses that conically expand in the direction of the attached ball cups.

4. Brace in accordance with claim 1, characterized in that the brace recess in the region of at least one brace attachment point is formed as an elongated slot.

5. Brace in accordance with claim 1, characterized in that the brace in the region of one end is provided with a bend relative to a center section of the brace of about 90° to 110° and in the region of the other end is provided with a bend of about 160° to 170° relative to the center section and in a direction opposite to that of the first mentioned bend.

* * * * *